(No Model.) 2 Sheets—Sheet 1.

N. W. SPEERS, Sr.
BALING PRESS.

No. 294,818. Patented Mar. 11, 1884.

WITNESSES
H. H. Young
E. W. Callahan

INVENTOR
Noah W. Speers Sr.
By Knight Bros.
Attorneys (No Model.)  2 Sheets—Sheet 2.

N. W. SPEERS, Sr.
BALING PRESS.

No. 294,818.  Patented Mar. 11, 1884.

WITNESSES
H. H. Young
E. W. Gallaher

INVENTOR
Noah W. Speers, Sr.
By Knight Bros.
attorneys

UNITED STATES PATENT OFFICE.

NOAH W. SPEERS, SR., OF MEMPHIS, TENNESSEE, ASSIGNOR OF ONE-HALF TO WILLIAM A. SMITH, OF SAME PLACE.

BALING-PRESS.

SPECIFICATION forming part of Letters Patent No. 294,818, dated March 11, 1884.

Application filed July 2, 1883. (No model.)

*To all whom it may concern:*

Be it known that I, NOAH W. SPEERS, Sr., a citizen of the United States, residing at Memphis, in the county of Shelby and State of Tennessee, have invented certain new and useful Improvements in Baling-Presses, of which the following is a specification.

My invention consists in forming the box or crate of a cotton or hay press in two separate parts, having removable and pivoted end and side sections capable of being locked into place when a bale is in position for compression.

The invention also relates to means for operating the presser-head, whereby great saving in loss of power by friction and in economy of material is effected. To these ends I employ a sprocket-bar, with which the sprockets of a horizontal shaft situated either above or below the press engage. These bars, being attached at one end to the presser-head, will raise or lower the same to compress or release the bale of cotton or hay.

In order that my invention may be fully understood, I will proceed to describe it with reference to the accompanying drawings, in which—

Figure 1:
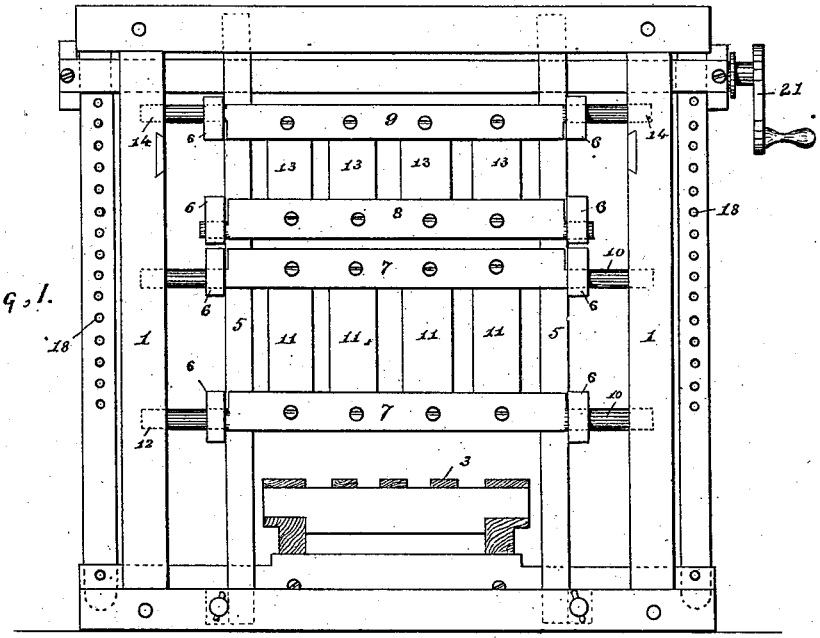
Figure 2:
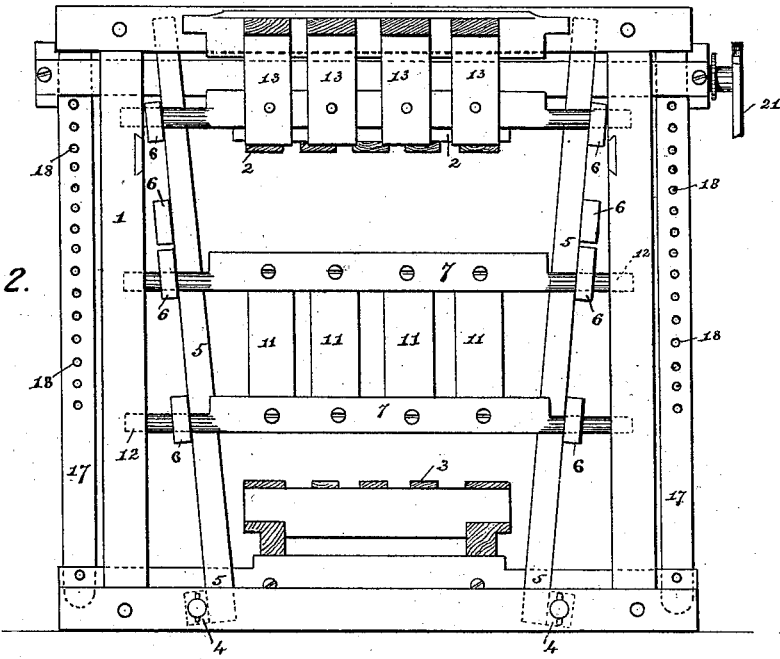
Figure 3:
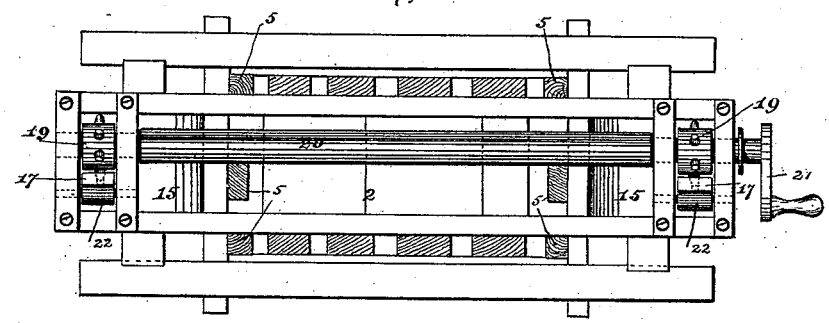
Figure 4:
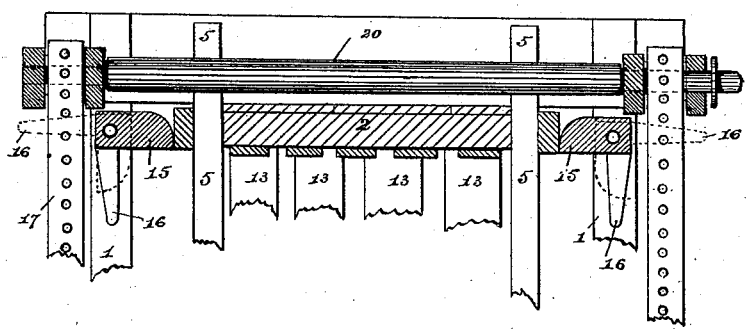

Figure 1 represents a front elevation of my improved press. Fig. 2 is also a front elevation, showing the box unlocked and opened to permit the more ready filling in of the material to be baled. Fig. 3 is a plan and Fig. 4 a partial sectional view of the press through the locking-cams and levers.

1 represents the frame, 2 the platen, and 3 the follower, of my press, these parts being of any usual or approved construction. Within and between the front and back beams forming the base of the frame are journaled shafts 4, having fixed thereto the battens 5, which, together with cross-beams 6, form the sides of the press-box. Cross-beams 6 serve to hold the side battens together, and are provided near the ends with bearings for the cross-braces 7 8 9 of the front and back battens. Said braces 7 8 9 are all so formed at their ends 10 as to permit the movement of the side 5 6 when swung upon the pivot-shafts 4.

The front and back portions of the press-box are formed in two sections, of which the lower ones, 11 11, are fixed within the frame at 12 12, while the upper portions, 13 13, are hinged within the frame at 14 14 by means of top braces 9 in such manner as to form doors to permit the filling in of the cotton and removal of the bale. The lower braces, 8, of the doors 13 are also slightly prolonged to engage in sockets on two of the braces 6 when the doors are closed down and the sides drawn together to lock the box. The pressing of the sides to place and the locking of them therein is effected by means of cam-blocks 15, pivoted in the frame, and each provided with a lever, 16, by means of which they are operated. By bearing upon the top braces 6, the blocks 15 jam the sides close home and hold them in position until released by the raising of the levers 16.

Hinged or otherwise fastened to the ends of the follower or presser-block are two upright rods or bars, 17, which are provided with series of holes, slots, or recesses 18, adapted to engage the sprockets of wheels 19 on the shaft 20, which is journaled in the sides of the frame at top, and is adapted to be operated by crank 21 or any suitable mechanism. Upon the side of the bars 17 opposite the sprocket-wheels 19, I arrange idle-rollers 22, adapted to bear against the bars 17, to increase and equalize the friction of the wheels 19 thereon. By this arrangement I provide a simple and cheap substitute for the ordinary spur and rack gearing, and effect a considerable reduction in loss of power by friction.

In the illustration I have shown but one series of sprockets upon each wheel, and holes in the lifting-bars; but it is evident that a greater number can be used with a corresponding gain in strength of the wheel.

Having thus described my invention, the following is what I claim as new therein and desire to secure by Letters Patent:

1. In a baling-press having a two-part press-box, the hinged sides having projecting beams adapted to surround and retain the elongated braces of the front and back battens, substantially as specified.

2. The combination, with the fixed front and rear battens of a press-box, of the hinged sides and upper door or doors, said sides having bearings adapted to engage and lock the hinged doors when pressed to place, substantially as specified.

3. The combination, with hinged front and back battens having elongated braces, of hinged sides having brackets for engaging said elongated braces, and suitable cam-blocks for holding them in closed position, substantially as set forth.

4. In a baling-press, the combination, with the follower or presser-block, of the draw bars or rods having one or more series of holes, the transverse driving-shaft, and sprocket-wheels thereon, arranged and adapted to operate substantially as specified.

NOAH W. SPEERS, Sr.

Witnesses:
H. BROOKS,
J. W. JUSTICE.